June 10, 1924.
S. W. BRIGGS
1,497,064
FRAME FOR SCRAPERS OR DIGGERS
Filed Sept. 1, 1923       2 Sheets-Sheet 1
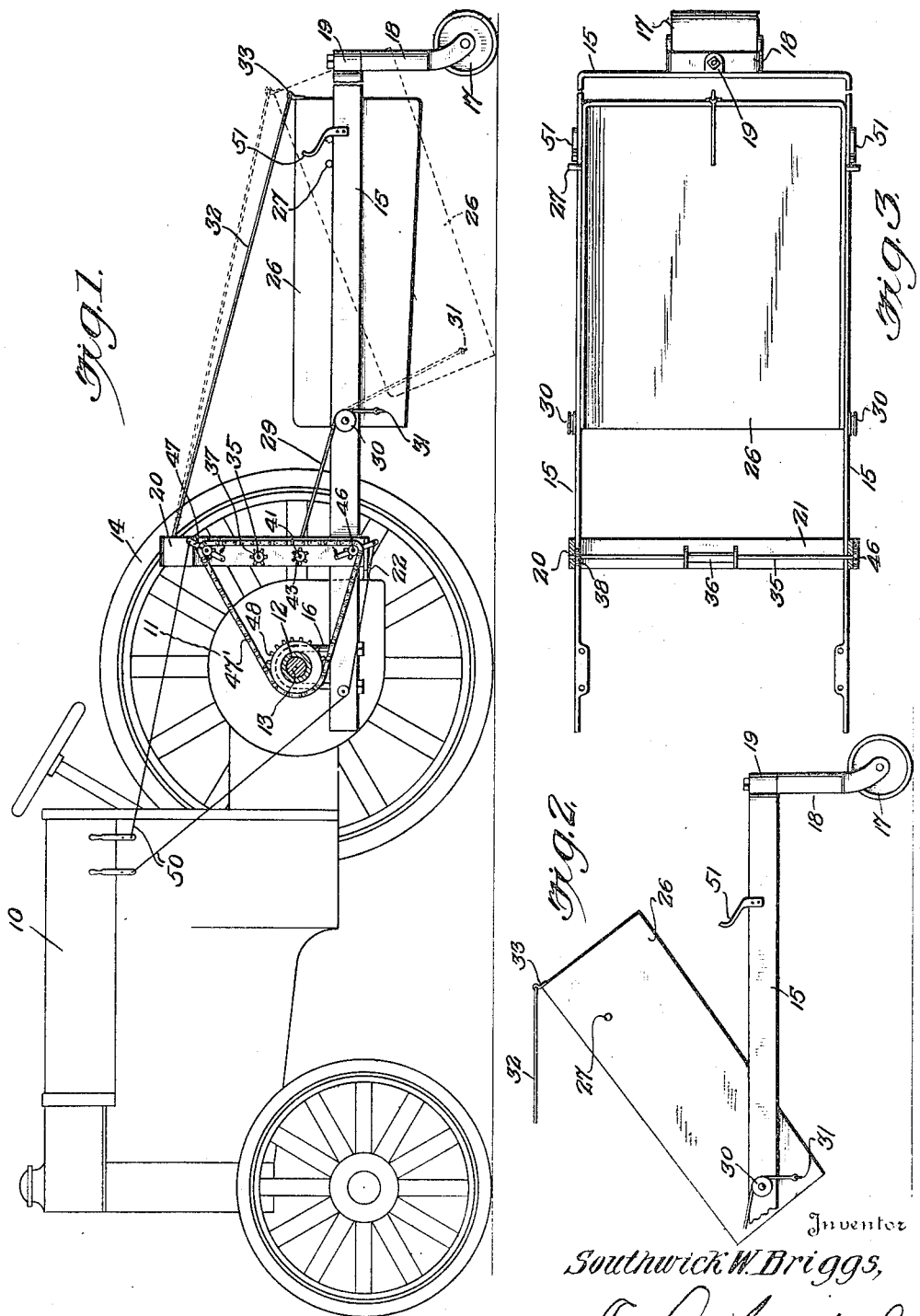
Inventor
Southwick W. Briggs,
By
Attorney

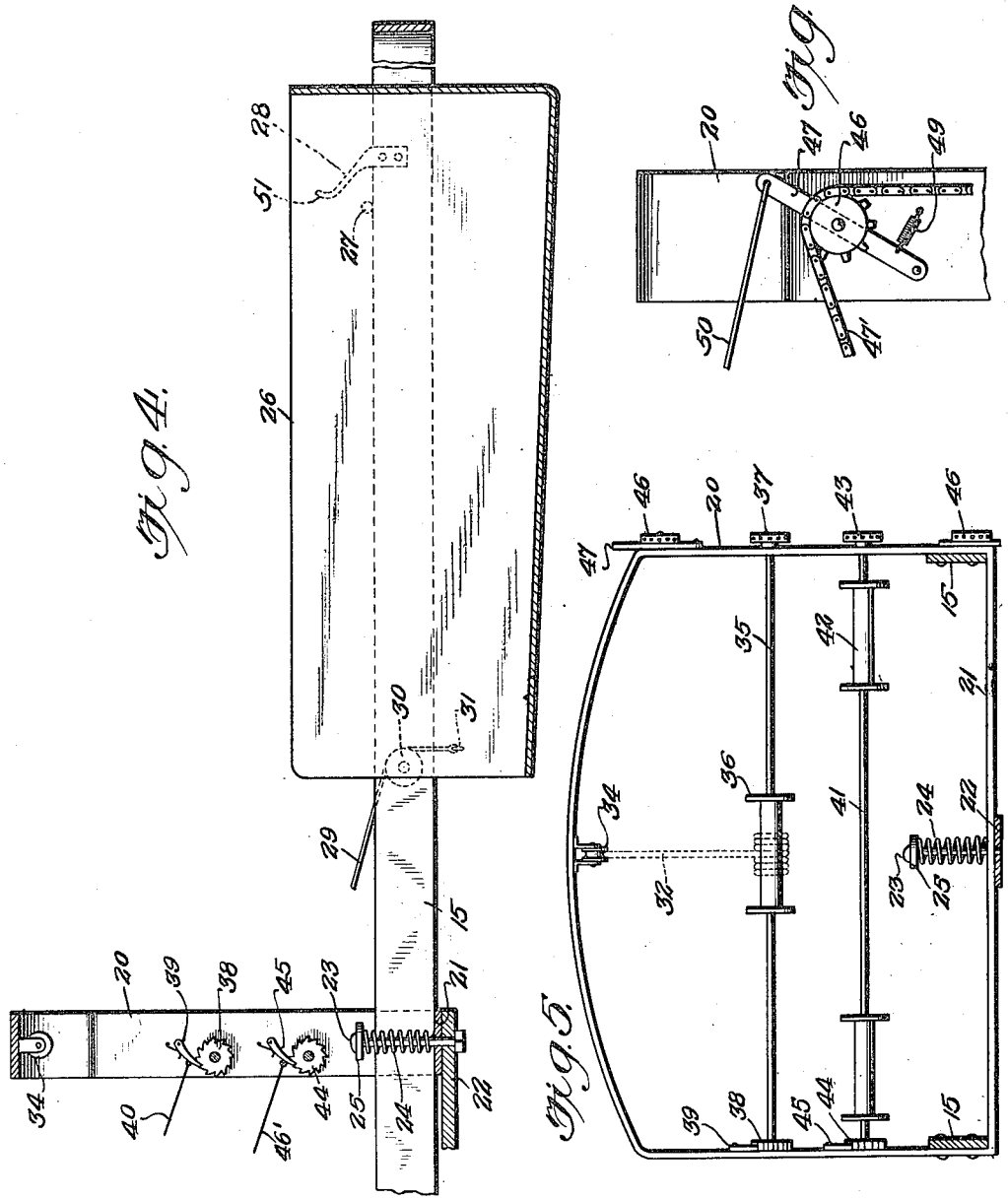

Patented June 10, 1924.

1,497,064

UNITED STATES PATENT OFFICE.

SOUTHWICK W. BRIGGS, OF GLENMONT, MARYLAND.

FRAME FOR SCRAPERS OR DIGGERS.

Application filed September 1, 1923. Serial No. 660,602.

*To all whom it may concern:*

Be it known that I, SOUTHWICK W. BRIGGS, a citizen of the United States, residing at Glenmont, in the county of Montgomery and State of Maryland, have invented certain new and useful Improvements in Frames for Scrapers or Diggers, of which the following is a specification.

The present invention relates to scrapers and diggers, and more particularly to a device of this character adapted for mounting upon a structure.

An object of the invention is to provide an improved frame for a scraper or digger which may be mounted upon a structure of the Fordson type, and which may utilize the rear end of the structure for supporting the front of the frame and for transmitting power from the drive wheels of the tractor to the device for raising and lowering the opposite ends of the scraper to load and unload the same.

Another object of the invention is to provide an improved coupling between the scraper frame and the hitch or clevis of the tractor which will support the frame in proper horizontal position and which at the same time will yieldingly permit the frame to rise and fall incident to obstructions in the roadway and undulations in the surface thereof.

A further object of the invention is to provide a novel connection between the scraper and its frame for permitting the raising and lowering of the opposite ends of the scraper and for taking up the thrust of the scraper when the forward end thereof is brought in contact with the ground, and which will hold the scraper from rising at its upper end under such conditions.

The invention still further aims at the provision of an improved scraper and means for operating the same for filling and dumping the scraper pan, which means are actuated from the driving mechanism of the tractor and may be controlled from the driver's seat so that the device may be under the guidance and control of the person operating the tractor.

The above and various other objects and advantages in this invention will in part be described in, and in part be understood from, the following detail description of the present preferred embodiment, the same being illustrated in the accompanying drawings, wherein—

Fig. 1 is a side elevation of a scraper constructed according to the present invention and as mounted upon a Fordson tractor, the dotted lines showing the front end of the scraper pan lowered for filling the same.

Fig. 2 is a similar view of the rear end portion of the scraper showing the rear end of the pan elevated for dumping the same.

Fig. 3 is a top plan view of the device, partly in section, removed from the tractor.

Fig. 4 is a longitudinal central section taken vertically through the scraper device, showing the connection of the same to the clevis of the tractor.

Fig. 5 is a front elevation of the upright portion of the scraper frame, showing its connection to the tractor and showing the operating shafts for raising and lowering the opposite ends of the scraper pan, and Fig. 6 is a fragmentary enlarged view of the upper corner of the upright portion of the scraper frame, showing the adjustable drive mechanism for dumping the scraper pan.

Referring to the drawings, 10 designates a tractor, preferably the Fordson type, and which is provided with a differential gear casing 11 having an axle housing 12 at each side thereof, and an axle section 13 in each housing, the axle section 13 being connected to an adjacent rear drive wheel 14.

The scraper comprises a substantially U shaped frame 15, which may be made of metal beams of any suitable configuration, and which is arranged to engage at its forward upper end beneath the axle sections 13, and be screwed to the axle housings 12 by U bolts 16 or the like adapted to be looped upwardly over the axle housings and at their free ends be screwed in the forward portions of the frame 15. The U bolt 16 is adapted to hingedly engage upon the axle sections so that the frame 15 may freely swing in a vertical plane.

The rear end of the frame 15 is mounted upon a castor roller 17 arranged in a fork bracket 18 connected by a strap 19 or the like to the rear end of the frame 15. The roller 17 is of sufficient width to permit the roller to move freely over soft ground without cutting into the same to any appreciable extent and so as to support heavy loads when desired.

The forward end of the frame 15 is provided, in spaced relation to the forward extremities of the sides of the frame, with an upright frame member 20 which may be arched over the frame, as shown in Fig. 5 particularly, and which is reinforced at its lower end by a cross bar 21 which is screwed across the lower edge of the frame 15. The bar 21 may be a continuation of the upright frame 20 as shown in Fig. 5, or may be otherwise suitably formed. The frame 20 and bar 21 are so spaced from the forward end of the frame 15 as to engage the bar 21 at its middle portion across the top of the hitch 22 or clevis of the tractor, and the clevis is provided with an upstanding bolt 23 about which is arranged a helical spring 24. A washer 25 rests on the upper end of the spring and beneath the head of the bolt 23 and the lower end of the spring 24 bears upon the upper face of the bar 21. It is apparent that any upward movement of the frame 15 carries with it the bar 21 and compresses the spring 24. The spring 24 therefore yieldingly holds the frame 15 in its normal horizontal position with the roller 17 in contact with the surface of the ground.

Fitting within the frame 15 is a receptacle or pan 26 which may be of any suitable configuration found desirable, and which in the present instance is shown as being slightly deeper at its rear end than at its forward end, and which is open at its top and at its forward end only. This pan 25 is provided at opposite sides with trunnion studs 27 adapted to rest upon the upper edge of the frame 15 at opposite sides and which is adapted to slide under the frame with the studs bearing thereon. The frame 15 has at opposite sides, and in rear of the studs 27, a pair of upwardly inclined shoulder hooks 28, which are arranged to receive the studs 27 therebeneath when the pan 26 is shifted rearwardly as when in the position shown in Fig. 1. The dotted lines in Fig. 1 show the forward end of the pan 26 in engagement with the surface of the ground and consequently the frictional contact between the ground and the pan slides the lugs 27 rearwardly on the frame and into position beneath the shoulder hooks 28. The pressure on the forward end of the pan is transmitted through the lugs or ears 27 against the hooks 28, and the latter are inclined forwardly at such an angle as to hold the lugs or ears 27 from rising from the frame 15 and from springing backwardly over the hooks 28.

The forward end of the pan 26 is suspended upon the lower ends of a pair of flexible connectors, such as steel cables or the like, as indicated at 29. These cables pass over pulleys 30 arranged opposite outer sides of the frame 15 forwardly of the pan 26 and are attached at the lower ends of the eyes 31 mounted upon the outer sides of the pan 26 and its forward end. The distance between the rollers or pulleys 30 and the shoulders 28 is greater than the distance between the trunnion lugs 27 and the eyes 31 so that the cable 29 when supporting the forward end on the scraper 36 seeks a substantially true vertical position and thus slides the trunnion 27 forward upon the frame 15 and from beneath the shoulder hooks 28. This position is shown in full lines in Fig. 1, and wherein the lugs 27 are free of the shoulder hooks 28. The rear end of the pan 26 is adapted to be raised, as shown in Fig. 2, and for this purpose a cable 32 may be employed, the cable being screwed by an eye piece 33 to the rear end of the pan 26. The cable 32 extends forwardly and upwardly to the top of the upright frame 20 where it passes over an idler 34. When the cable 32 is drawn in the rear end of the pan 26 is raised to the desired height, such as shown in Fig. 2 while the forward end of the pan is suspended and pivoted upon the lower ends of the cables 29.

The upright portion 20 of the scraper frame is provided with a transverse shaft 35 provided with a drum 36 upon its intermediate portion beneath the idler 34 so as to receive thereon the forward end of the cable 32. The shaft 35 is adapted to be wound by a sprocket wheel 37 for drawing the cable 32 in, and the shaft 35 is automatically locked in adjusted position by a ratchet wheel 38 fixed on the shaft 35 and with which engages a pawl 39 which is carried by the frame and yieldingly urged by a spring or the like into contact with the ratchet wheel 38. This structure is shown in Fig. 4 and wherein the pawl 39 is provided with a cable 40 or the like which extends into position adjacent the operator of the tractor so that the pawl 39 may be disengaged from the ratchet wheel 38 to permit the shaft 35 to freely unwind under weight of the rear end of the pan 26.

The upright portion 20 of the scraper frame is also provided, at a point beneath the shaft 35, with a lower shaft 41 provided near opposite ends with a pair of spools 42 adapted to receive thereon the forward portions of the cables 29. The shaft 42 may be driven by a sprocket wheel 43, and is provided at its opposite end with a ratchet wheel 44 arranged to receive a ratchet 45 thereagainst, the latter being spring pressed as shown in Fig. 4, and provided with a releasing cable 46' arranged to be engaged by the operator when the lower end of the scraper pan 26 is to be dropped down.

Various means may be provided for operating the shafts 35 and 41 independently one of the other. In the present instance, the upright portion 20 of the scraper frame has at one side and at its upper and lower corners in suitably spaced relation above and below the gear wheels 37 and 43, with sprocket wheels 46 adapted to receive thereover an endless chain 47' which is also trained over a drive sprocket 48 screwed to one of the rear wheels 14 of the tractor 38. The sprocket wheels 46 are mounted upon pivoted levers 47, as shown in Fig. 6, which are normally urged rearwardly by springs 49 to draw the drive chain 47' taut. The sprocket wheels 46 are continuously driven from the drive sprocket 48 and are adapted to be moved forwardly at times, by swinging the pivoted lever 47, to bring the forward run of the chain 47' into contact with either one of the sprocket wheels 37 or 43. When the upper sprocket wheel 46 is swung forwardly, the rear run of the chain 47' is brought into contact with the upper sprocket wheel 37 so as to drive the upper shaft 45 and thus elevate the rear end of the scraper. As soon as the upper sprocket wheel is released the spring 49 swings the rear run of the chain 47' backwardly a distance sufficient to escape the teeth of the sprocket wheel 37. In like manner, the lower sprocket wheel 46 is adapted to be retracted for bringing the rear run of the chain 47' into contact with the lower sprocket wheel 43 and thus drive the lower shaft 41. This arrangement, of course, may be varied as circumstances warrant.

The levers 47 may be provided with pull cords 50 which extend forwardly into proximity to the operator so that the operator may selectively pull on the cords 50 and thus raise or lower the opposite ends of the pan or scoop as found desirable and necessary.

It is apparent that the device comprises but few parts and may be made strong and durable and easily mounted upon a Fordson tractor. The device is also of such construction that it will not tend to overturn or tilt the tractor rearwardly as has been found the case with various devices coupled to the rear end of the tractor. When in use, the operator may draw on the lower cord 46' to release the lower shaft 41 and permit the front end of the pan 26 to drop into engagement with the ground. As the tractor is propelled in a forward direction, dirt and other accumulations desired are forced into the pan 26 until the latter is filled to a predetermined extent. The operator now pulls the lower cord 50 and connects the drive chain 47' to the lower shaft 41. This shaft 41 is now turned in a direction to take up the lower cables 29 and thus elevate the front end of the pan or scoop 26. From Fig. 4 it will be noted that the forward end of the scoop is raised in such position that the bottom of the scoop is preferably inclined at a slight angle rearwardly to thus retain the load which has been picked up by the scoop. As soon as the operator raises the forward end of the pan to the desired height, he releases the lower cable 50 and the spring 49 may then release the lower shaft 41. This lower shaft is held from retrograde movement by the pawl 45 and ratchet wheel 44.

When it is desired to dump the load on the pan or scoop 26 the operator pulls the upper cord 50 and thus connects the upper shaft 35 with the drive chain 47'. This winds the cable 32 upon the drum 36 and lifts the rear end of the scoop. Before lifting the rear end of the scoop the cable 32 slides the scoop longitudinally in a frame 15 in a forward direction as far as the lower cables permit. This removes the lugs or ears 27 from beneath the shoulder hooks 28, and thus allows the rear end of the pan to be raised without interruption. As soon as the pan is dumped, the drive chain 47' is released from the shaft 35 and the pawl 39 and ratchet 38 hold the pan 26 in elevated position as shown in Fig. 2. To return the scoop or pan to normal position it is only necessary to pull on the cable 40 to release the pawl 39 from the ratchet 38. The pan is now permitted to drop back into position upon the frame 15.

The strain of the scraper frame 15 and its parts is distributed between the axle housings 12 and the clevis 22 so that when the tractor 10 is turned, the rear end of the scraper frame 15 is swung laterally about the drive wheels 14 as a pivot and the castor roller 17 is designed to follow and support the scraper frame in its various positions. It will be noted that the shoulder hooks 28 are provided upon their upper ends with lips or cams 51 arranged to receive the lugs 27 when the rear end of the pan 26 drops back into position on the frame. These cams 51 are adapted to direct the lugs or ears 27 into position beneath the hooks 28 and to prevent the lugs from slipping over the hooks on to the rear end of the frame. The cams 51 may, of course, be arranged to the desired height and at the desired angle to accomplish this purpose.

It will be noted that the device is of simple and economical construction, and may for the most part be constructed of stock material. It will also be noted that the spring 24 normally maintains the frame 15 in its true horizontal position and yieldingly urges the scraper 26 into contact with the ground. The spring at the same time allows the scraper and its frame to yield under abnormal pressure to prevent injury to the parts of the device.

It is, of course, understood that various changes and modifications may be made in the details of construction and design of the above specifically described embodiment of this invention without departing from the spirit thereof, such changes and modifications being restricted only by the scope of the following claims:

What is claimed is:

1. In a scoop for tractors, a frame, means for attaching the forward end of the frame to the rear end of the tractor, a cross piece in the frame adapted to engage across the clevis of the tractor for supporting the frame thereon, and a scoop mounted in said frame.

2. In a scoop for tractors, a frame, means for pivotally connecting the forward end of the frame to the rear axle of the tractor, said frame having a cross member therein adapted to seat upon the clevis of the tractor, a connection between the clevis and said cross member for connecting the cross member to the clevis, and a scraper mounted in the frame.

3. In a scoop for tractors, a frame, means for pivotally connecting the forward end of the frame to the tractor, said frame having a cross member arranged to seat upon the clevis of the tractor, a spring connection between the cross member and the clevis for normally urging the frame downwardly, a scoop in the frame, and a castor roller on the rear end of the frame for normally supporting the same.

4. In a scoop for tractors, a frame, a scraper mounted with the frame, a roller on the rear end of the frame for supporting the same, hinged means upon the forward end of the frame adapted to engage the rear axle of the tractor to hinge the frame thereto, and a yieldable connection between the frame and the tractor for normally urging the rear portion of the frame downwardly to bind the scoop against the surface of the ground.

5. In a scoop for tractors, a frame, a scoop mounted in the frame, means for supporting the rear end of the frame from the ground, a pivotal connection between the forward end of the frame and the tractor, and a spring arranged between the frame and the clevis of the tractor for normally urging the frame downwardly.

6. In a scoop for tractors, a frame, means for connecting the frame to the tractor and for supporting the frame in substantially a horizontal position, a scoop suspended at opposite ends in the frame and means for independently raising and lowering said opposite ends of the scoop.

7. In a scoop for tractors, a frame adapted to be attached to a tractor, a scraper suspended at opposite ends in the frame, means for independently raising and lowering said opposite ends of the scraper, and means for rigidly connecting the rear end of the scraper to the frame when the forward end of the scraper is lowered to receive thrust of the scraper under impact of the same with the ground.

8. In a scoop for tractors, a frame adapted to be mounted in substantially a horizontal position upon a tractor, a scraper arranged in the frame, cables supporting the forward end of the scraper, a pair of ears outstanding from the scraper and engaging the upper edge of the frame for supporting the scraper therein, a cable connected to the rear end of the scraper for raising the latter out of the frame and swinging the scraper upon said forward cables, and shouldered hooks carried by the frame adapted to receive said ears from beneath when said scraper is shifted rearwardly by contact of the forward end of the scraper with the ground.

9. In a scoop for tractors, a frame, a scraper arranged in the frame with a pair of ears near its rear end arranged for sliding engagement upon the upper edge of the frame to support the rear end of the scraper, flexible means connected to the forward end of the scraper for raising and lowering the same and for pivotally suspending the forward end of the scraper on the frame, and means for elevating the rear end of the scraper out of the frame for dumping the scraper, said ears being adapted to be shifted rearwardly by contact of the forward end of the scraper with the ground, and a pair of upstanding and forwardly inclined shoulder hooks carried by the frame for receiving said ears therebeneath to prevent the rise of the rear end of the scraper when the forward end thereof is thrust backwardly by contact with the ground.

10. In a scoop for tractors, a frame, a scraper mounted in the frame, means for attaching the frame to a tractor, a pair of shafts mounted in the frame, cables on one shaft adapted to engage the forward end of the scraper for raising and lowering the same, a cable on the other shaft connected to the rear end of the scraper for raising and lowering the same, a pair of ears on said scraper near the rear end thereof, interlocking means carried by the frame adapted to engage said ears when the scraper is shifted rearwardly to the frame and power means for selectively operating said shafts.

11. In a scoop for tractors, a frame adapted to be attached to a tractor and having an upstanding part near its forward end, a scraper arranged in the frame and having a pair of ears near its rear end for slidable engagement in the frame, a pair of shafts in said upright portion, cables on said shafts connected to the forward and rear ends of the scraper for raising and lowering the same, pawls and ratchets connected to said shafts for holding the same in adjusted position, drive means adapted to be connected to the tractor and arranged to independently operate said shafts for raising the opposite ends of said scraper.

12. In a scoop for tractors, a frame, means for connecting the frame horizontally to a tractor, a scraper in the frame having outstanding lugs at opposite sides engaging the lugs to support the scraper therein, means for suspending the forward end of the scraper and arranged to release said forward end for contact with the ground, said scraper being adapted to be shifted rearwardly in the frame when in contact with the ground, to slide said lugs rearwardly in the frame, shouldered hooks mounted on the frame adapted to receive said lugs therebeneath when shifted backwardly, and cam portions on the upper ends of said shouldered hooks for receiving said lugs thereagainst to direct the lugs downwardly beneath said shouldered hooks.

In testimony whereof he affixes signature.

SOUTHWICK W. BRIGGS.